United States Patent [19]

Matsui

[11] Patent Number: 4,992,684
[45] Date of Patent: Feb. 12, 1991

[54] LINEAR MOTOR AND DRIVING APPARATUS USING THE SAME
[75] Inventor: Norio Matsui, Yokohama, Japan
[73] Assignee: Canon Kabushiki Kaisha, Tokyo, Japan
[21] Appl. No.: 398,393
[22] Filed: Aug. 25, 1989
[30] Foreign Application Priority Data
  Aug. 26, 1988 [JP] Japan .............................. 63-210608
[51] Int. Cl.$^5$ ........................................... H02K 41/00
[52] U.S. Cl. .................................... 310/12; 336/208; 360/78.13
[58] Field of Search .................... 310/12, 14; 336/198, 336/208; 360/78.13
[56] References Cited
  U.S. PATENT DOCUMENTS
  4,864,170  9/1989  Eguchi .................................. 310/12
  FOREIGN PATENT DOCUMENTS
  0140402  6/1987  Japan .................................... 336/208

Primary Examiner—Steven L. Stephan
Assistant Examiner—Judson H. Jones
Attorney, Agent, or Firm—Fitzpatrick, Cella, Harper & Scinto

[57] ABSTRACT

A linear motor device having a magnet, a first yoke for holding the magnet in a direction perpendicular to the magnetic flux in the clearance thereof, a second yoke disposed parallel to the first yoke so that there may be obtained a magnetic closed circuit of the magnetic flux, a third yoke fixed between the opposite ends of the second yoke and the first yoke, and a coil bobbin holding thereon a coil wound in a direction which intersects the magnetic flux, and provided with a driving coil movable along the first yoke extending through the coil bobbin upon electrical energization of the coil, characterized in that the thickness of that portion of the coil bobbin which intervenes between the first yoke and the magnet is restricted so that the interval kept between the first yoke and the magnet can be set on the basis of the thickness of the wound lamination of the coil.

5 Claims, 12 Drawing Sheets

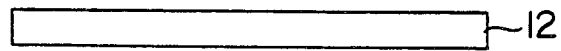
FIG.3A
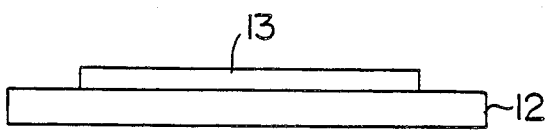
FIG.3B
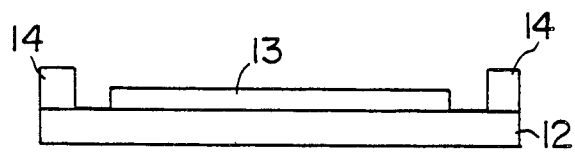
FIG.3C
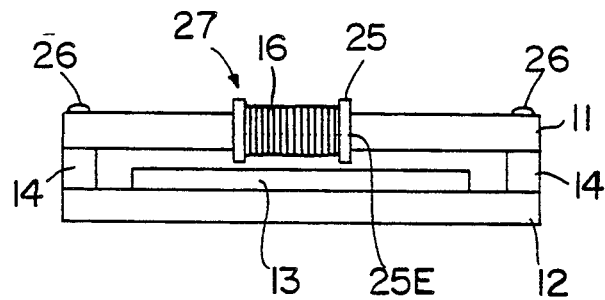
FIG.3D

LINEAR MOTOR AND DRIVING APPARATUS USING THE SAME

BACKGROUND OF THE INVENTION

1. Field of the Invention

This invention relates to a linear motor device, and more particularly to a linear motor device used as driving means or the like for driving the optical pick-up unit of an optical type recording-reproducing apparatus.

2. Related Background Art

In recent years, the tendency of recording-reproducing apparatuses to have a large capacity has increased and attention has been paid to optical disc memories as high-density recording mediums therefor. Now, to record information in such an optical disc memory or read out the recorded information, it is necessary to drive a carriage carrying thereon an optical pick-up movable along the surface of the optical disc, and a linear motor of the voice coil type has been used as driving means therefor.

FIGS. 9 and 10 of the accompanying drawings shows an example of an optical pick-up driving apparatus using such a linear motor. In these figures, the reference numeral 1 designates a disc supported by a hub 2 and rotatively driven by a spindle shaft 3, and relative to such a disc 1, an optical pick-up 5 provided with an objective lens 4 is carried on a head carriage 6, which is movable in the direction of arrow along shafts 8 on a pedestal 7. The reference numeral 10 denotes linear motors for driving the head carriage 6.

The linear motors 10 are provided at the opposite sides of the shafts 8, and as shown in FIG. 11 of the accompanying drawings, each of the linear motors is comprised of a center yoke 11, a side yoke 12, a magnet 13 fixed to the side yoke 12, a relay yoke 14 for coupling the center yoke 11 and the side yoke 12 together at their opposite ends, a coil bobbin 15 movable along the center yoke 11, and a coil 16 wound on the bobbin 15. Mounting portions 15A of the bobbin 15 are fixed to the opposite end portions of the head carriage 6.

So, in the linear motor 10 thus constructed, by supplying an electric current to the coil 16 through a magnetic circuit constituted by the center yoke 11, the relay yoke 14, the side yoke 12 and the magnet 13, the coil 16 can be moved with the bobbin 15 along the center yoke 11, thereby moving the head carriage 6.

Now, in such a prior-art linear motor 10, as shown in FIG. 12 of the accompanying drawings, it is necessary to keep a gap $L_G$ between the center yoke 11 and the inner surface of the coil bobbin 15 which is opposed to the center yoke 11 in order to make the coil bobbin 15 movable along the center yoke 11. This gap $L_G$ should desirably be at least 0.5 mm from a consideration of the assembly error of the linear motor 10 or dynamic factors such as the deformation of the bobbin due to the heat generation resulting from the electrical energization of the coil and the deformation due to the inertia force caused, by the generation of an electromagnetic force large enough to move the head carriage unit.

Also, when the thickness of the coil-wound portion 15B of the coil bobbin 15 is $L_B$ and the height of the rib portion 15c at the opposite ends thereof is $L_H$, the thickness $L_B$ should desirably be 0.5 mm or more from the viewpoints of strength and shaping factors, and the height $L_H$ of the rib portion should desirably be greater than the winding thickness $L_C$ of the coil 16.

Accordingly, the interval L kept between the magnet 13 and the center yoke 11 is $$L = L_B + L_H + 2L_G. \tag{1}$$

So, the interval L need be the rib height $L_H$ prescribed by the coil winding thickness $L_C$, plus at least 1.5 mm.

SUMMARY OF THE INVENTION

However, where there is no limitation in the interval L in the design of a magnetic circuit, there is no problem, but for example, where it is required to make the interval L smaller than the above-mentioned value in order to efficiently keep sufficient permeance to obtain the necessary magnetic flux density, efficient design becomes, difficult from the viewpoint of limitations in physical dimensions of the apparatus.

It is an object of the present invention to solve the above-noted problem peculiar to the prior art and to provide a linear motor device in which the interval L between a magnet and a yoke movably holding a coil bobbin which is set to move the coil bobbin can be made smaller by an amount corresponding to the thickness $L_B$ of the coil-wound portion 15B and which can contribute to the setting of a magnetic circuit for obtaining an optimum permeance coefficient.

It is another object of the present invention to flatten the driving coil portion of a linear motor for driving a head carriage in order to achieve the above object, and more specifically to propose a coil bobbin holding a coil which is improved in the structure of the portion of the coil bobbin on which the coil is wound.

It is a further object of the present invention to propose, in the structure of a coil bobbin, a novel coil holding structure of the coil bobbin holding a coil.

BRIEF DESCRIPTION OF THE DRAWINGS

FIG. 3 illustrates the procedure of assembly of the linear device of the present invention.

DESCRIPTION OF THE PREFERRED EMBODIMENTS

Some embodiments of the present invention will hereinafter be described in detail with reference to the drawings.

Figure 1:
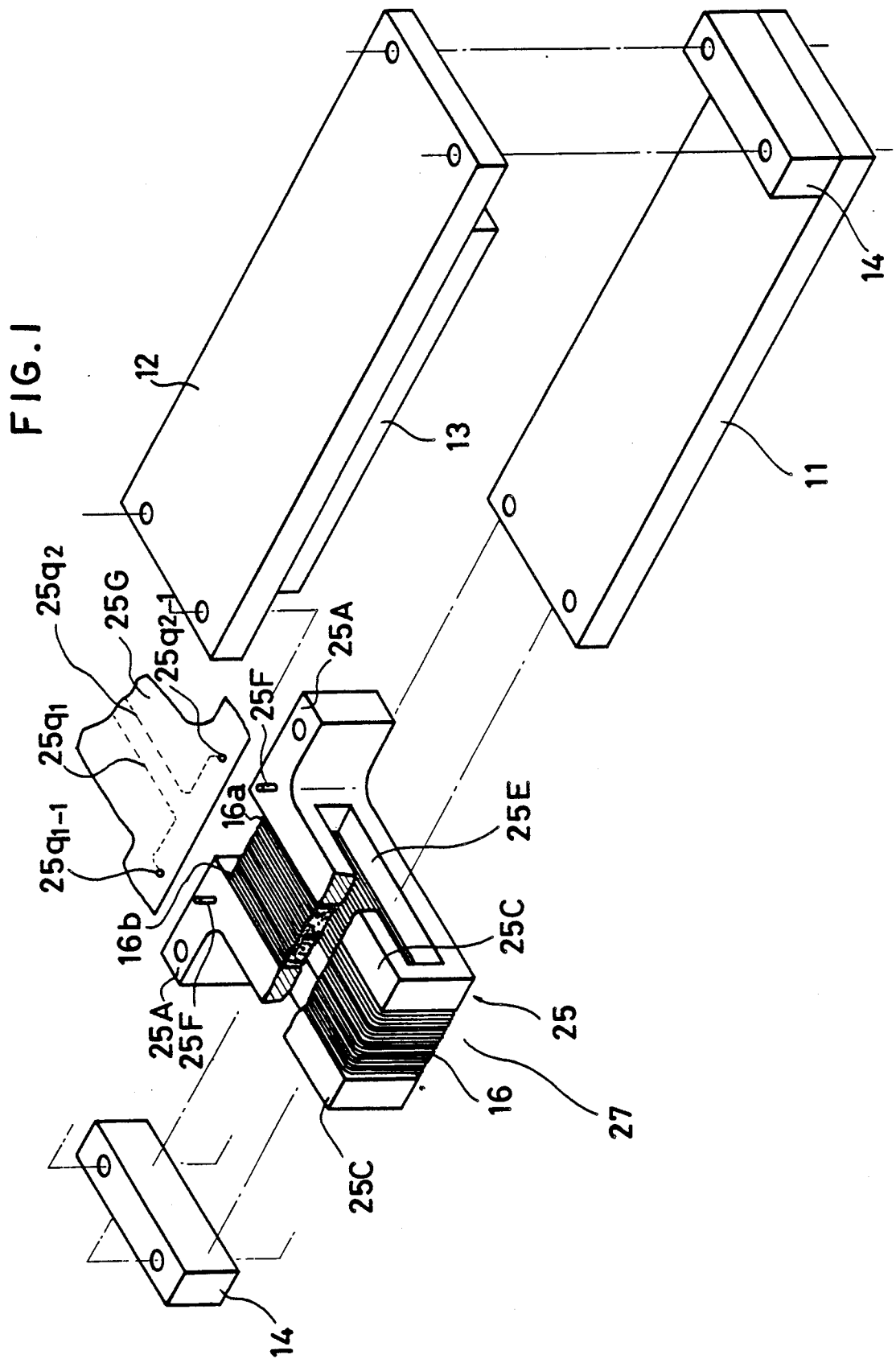
FIG. 1 is an exploded perspective view showing the construction of a first embodiment of the present invention.
Figure 2:
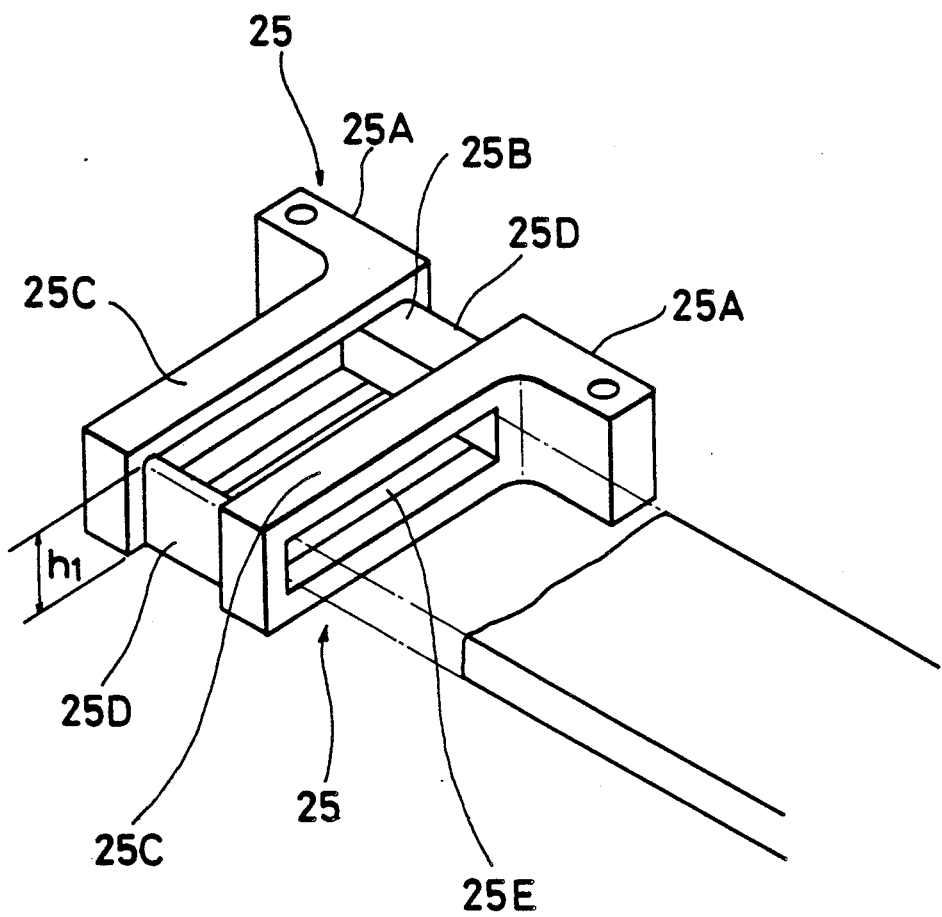
FIG. 2 is a perspective view showing the construction a coil bobbin according to the first embodiment.
Figure 9:
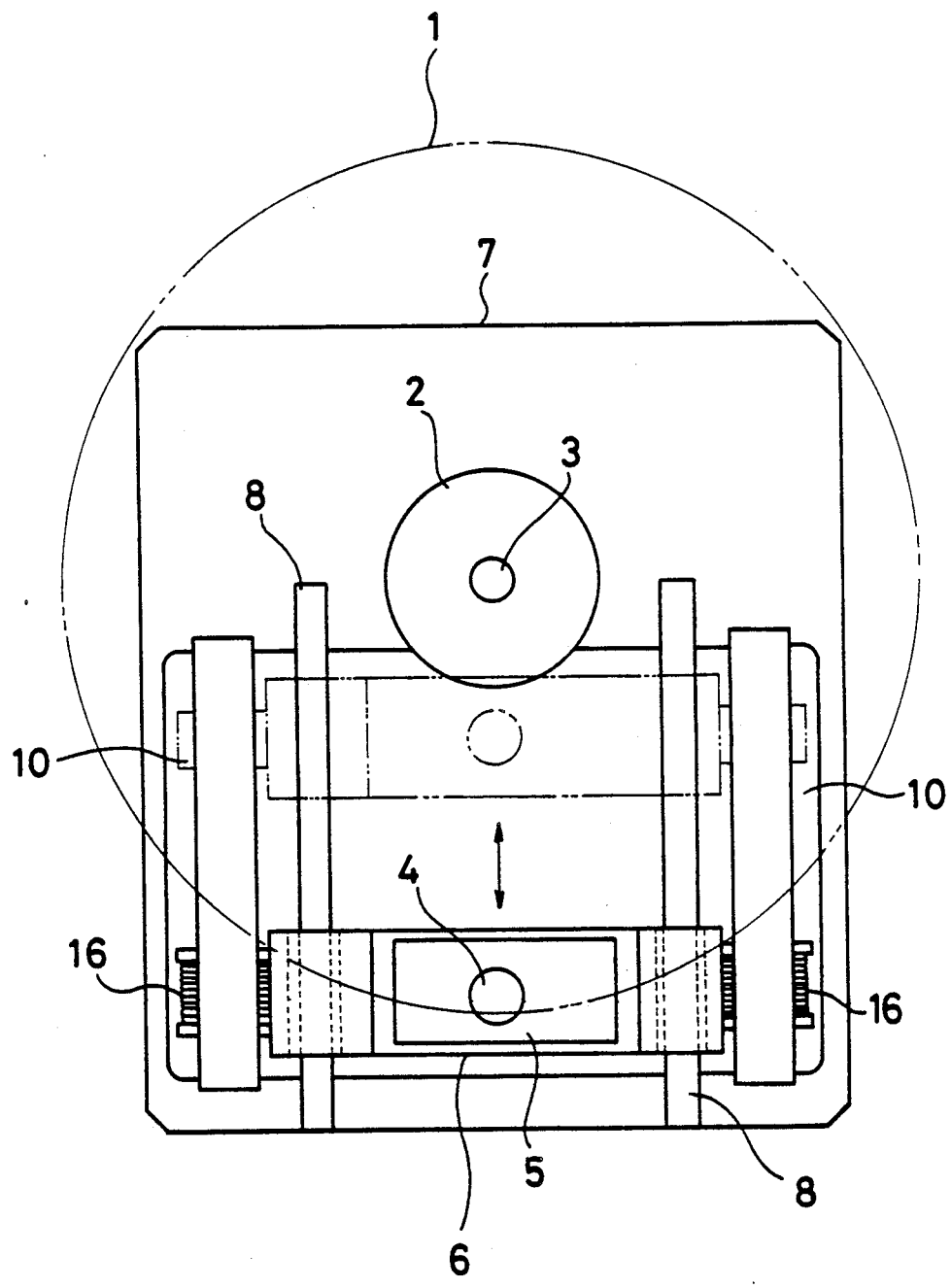
FIG. 9 illustrates a prior-art linear motor device applied for driving an optical head carriage.
Figure 10:
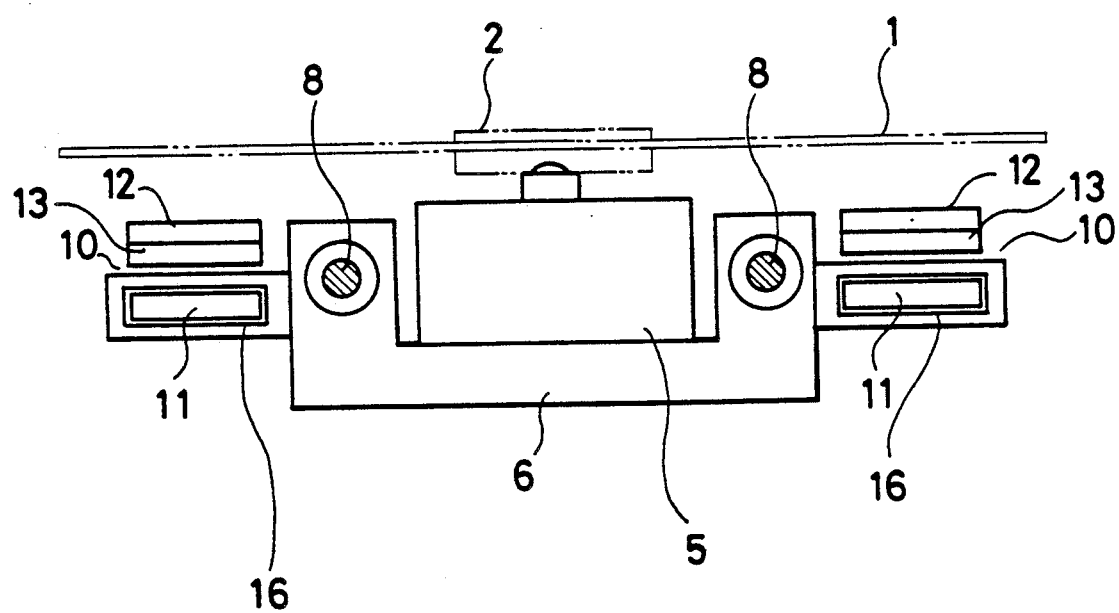
FIG. 10 is a cross-sectional view of the linear motor device of FIG. 9.
Figure 11:
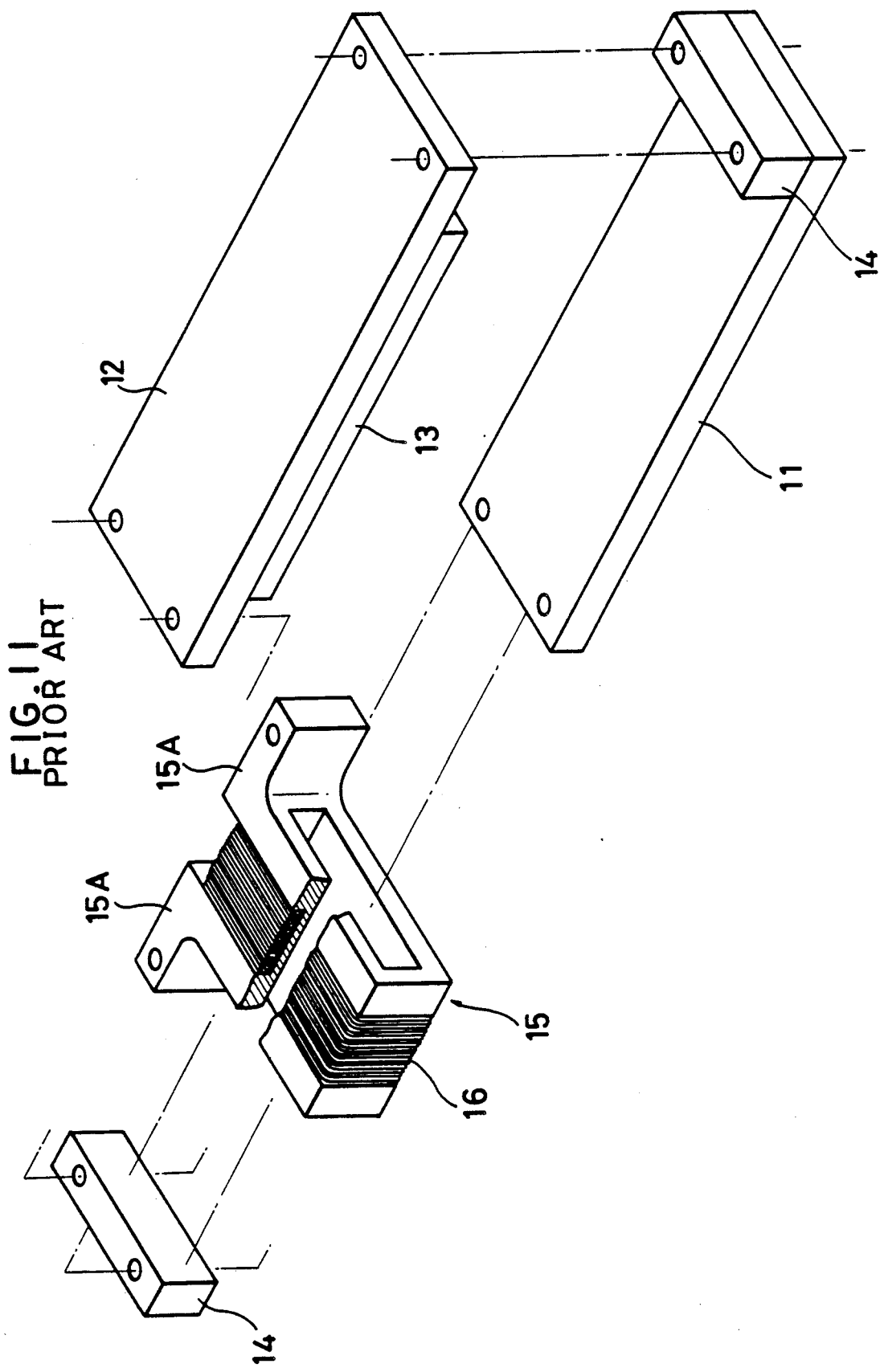
FIG. 11 is an exploded perspective view showing the construction of the prior-art linear motor device.

FIG. 1 shows an embodiment of the present invention. In FIG. 1, the reference numeral 25 designates a coil bobbin provided by molding a non-magnetic material, for example, a resin material. The coil bobbin 25 in the present embodiment, as shown in FIG. 2, has, in the coil-wound portion 25B thereof, no upper and lower portions along a center yoke (a first yoke) 11, and is provided with coil receiving portions 25D and 25D only along the side surfaces of the center yoke 11. The coil receiving portions of the coil bobbin 25 are provided so as to be opposed to the side surfaces of the center yoke 11, and the height $h_l$ of the coil receiving portions 25D and 25D is such a dimension that a coil 16 does not protrude above the upper surface of rib portions when the coil is wound a predetermined number of turns. The reference character 25A denotes the mounting portion of the bobbin with respect to a head carriage 6 (see FIG. 9), and the reference character 25C designates rib portions provided on the opposite end portions of the coil wound on the coil-wound portion 25B.

The winding of the coil onto the coil bobbin 25 is accomplished by successively winding the coil onto the coil-wound portion 25B in alignment from the turn-starting terminal 16a of the coil, and drawing out the turn-terminating terminal 16b of the coil. The turn-starting terminal 16a and the turn-terminating terminal 16b are twined on pins 25F and 25F studded on the rib portions 25C and 25C of the coil bobbin. The reference character 25G designates a flexible printed circuit plate. Circuit patterns $25g_1$ and $25g_2$ for supplying electric power to the coil 16 are provided on the circuit plate 25G, and the aforementioned pins 25F and 25F are inserted into through-holes in land portions $25g_{1-1}$ and $25g_{2-1}$, and the circuit patterns and the terminals 16a and 16b are solder-connected together.

The procedure of assembly of the linear motor device shown in FIG. 1 will now be described with reference to FIG. 3. First, as shown in FIG. 3(A), a side yoke (a second yoke) 12 is prepared, whereafter as shown in FIG. 3(B), a magnet 13 is superposed on the side yoke 12 and fixed, and then relay yokes 14 are placed on the opposite end portions of the side yoke 12 by the use of a jig or the like, not shown. At the stage of FIG. 3(D), the center yoke 11 is passed through a through-hole 25E in the coil bobbin 25 holding the coil 16 thereon, whereafter the center yoke 11 is aligned on the relay yokes (third yokes) 14, and is fixed thereto by fixing screws 26. The magnet 13 is magnetized with an S pole on the surface thereof opposed to the center yoke 11 and with an N pole on the surface thereof to which the side yoke 12 is secured.

Figure 4:
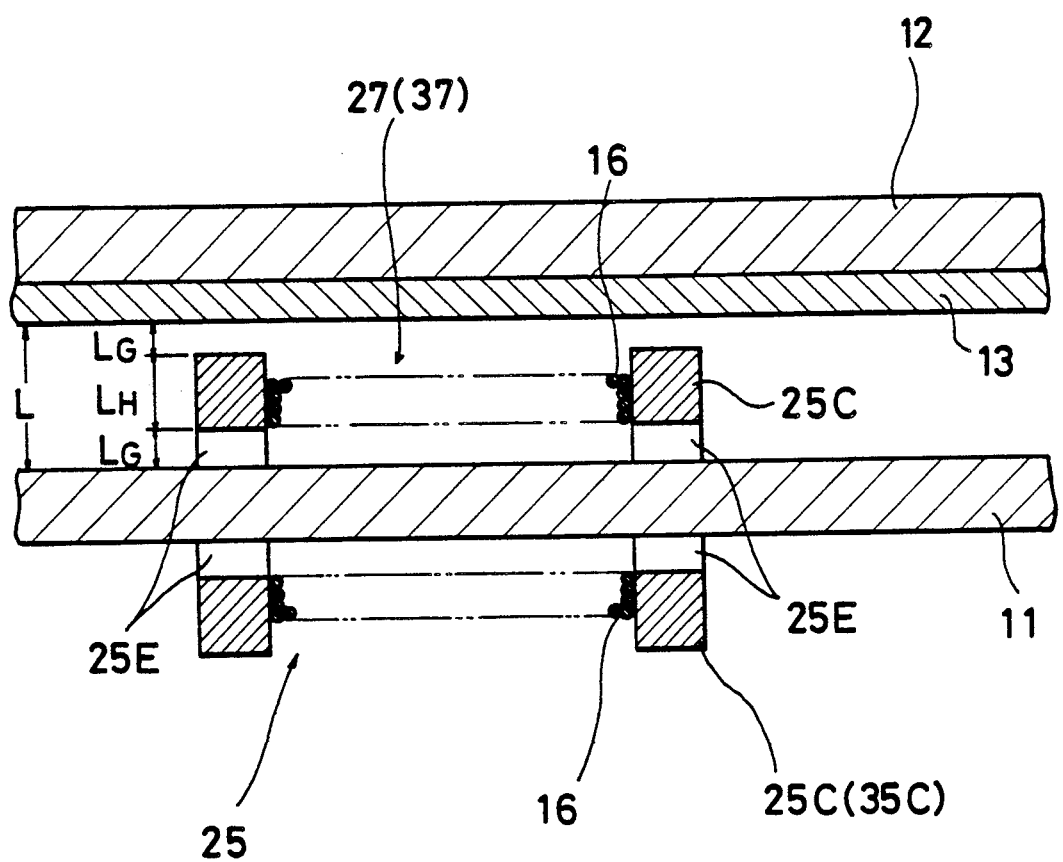
FIG. 4 is a cross-sectional view of the first embodiment of present invention.
Figure 12:
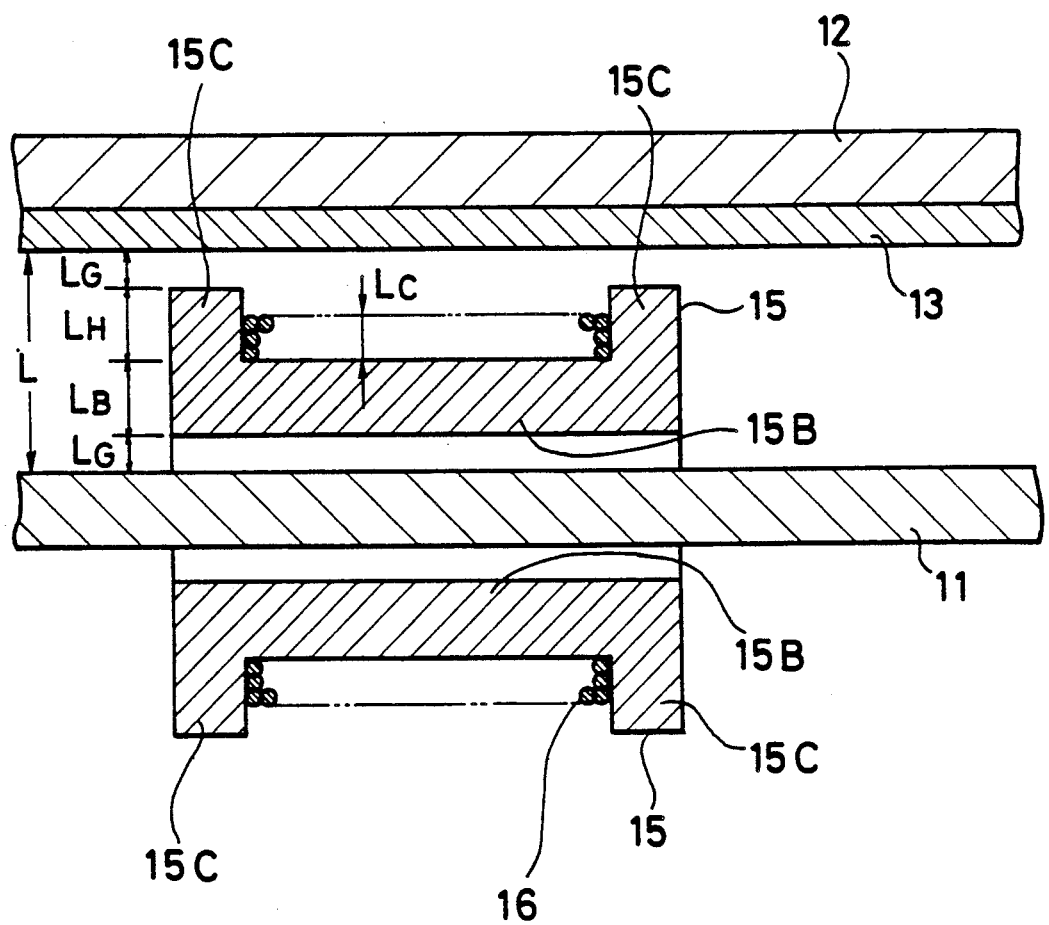
FIG. 12 a cross-sectional view of the linear motor device of FIG. 11.

In the driving coil 27 of the linear motor device thus constructed, as shown in FIG. 4, the interval L can be set to the sum of the rib height $L_H$ and the double of the gap $L_G$, and if here, $L_G$ is 0.5 mm, the interval L may be the rib height $L_H$ plus only 1 mm, and can be made smaller by an amount corresponding to the thickness $L_B$ of the coil-wound portion as compared with FIG. 12.

In constructing such a coil bobbin 25, insulating varnish may be applied between the layers of the coil 16 to eliminate the gaps between the turns of the coil, thereby preventing the floating-up of the coil 16 and enhancing the insulating resistance.

Figure 5:
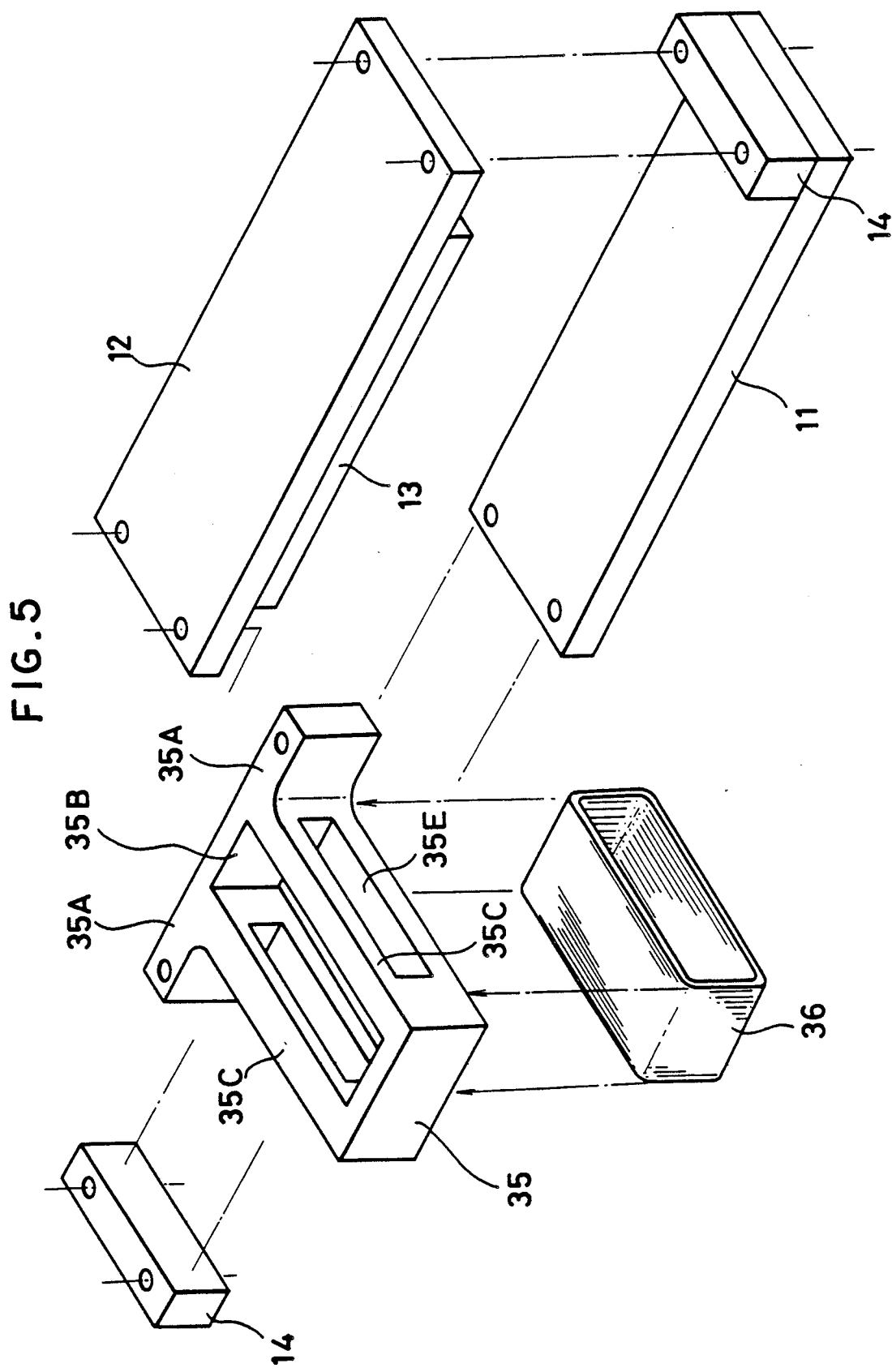
FIG. 5 is an exploded perspective view showing the construction of a second embodiment of the present invention.
Figure 6:
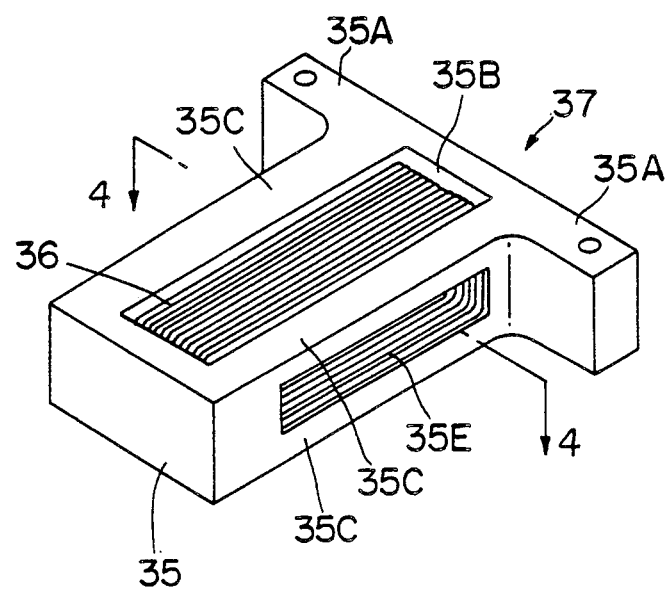
FIG. 6 is a perspective view showing the construction driving coil according to the second embodiment.

FIG. 5 shows another embodiment of the present invention. The coil bobbin 35 of the present embodiment, as shown in FIG. 5, has no coil-wound portion and has a coil housing portion 35B vertically opening in conformity with the configuration of a coil member 36 and communicating with through-holes 35E into which the first yoke 11 is inserted. So, in the case of the present embodiment, as in the case of a bobbinless coil, the spaces between the turns of the coil can be filled with an adhesive agent and the coil can be fixed to thereby provide a unitary coil member 36, and by inserting such a coil member 36 into the coil housing portion 35B and securing it thereto, there can be provided a driving coil 37 as shown in FIG. 6. The reference character 35A designates mounting portions, the reference character 35C denotes rib portions, and the reference character 35E designates through-holes.

So, again in the case of the present embodiment, the cross-section of the driving coil 37 along line B-B indicated in FIG. 6 is similar to that shown in FIG. 4, and the interval L kept between the magnet 13 and the center yoke 11 can be set to $(L_H + 2 \times L_G)$. Again in the case of the coil bobbin shown in FIG. 5, pins 35F and 35F are studded in the upper surface of the rib portions and the terminals (not shown) of the coil are wound thereon, and electric power is supplied by a circuit plate, not shown, as in the case of FIG. 1.

Figure 7:
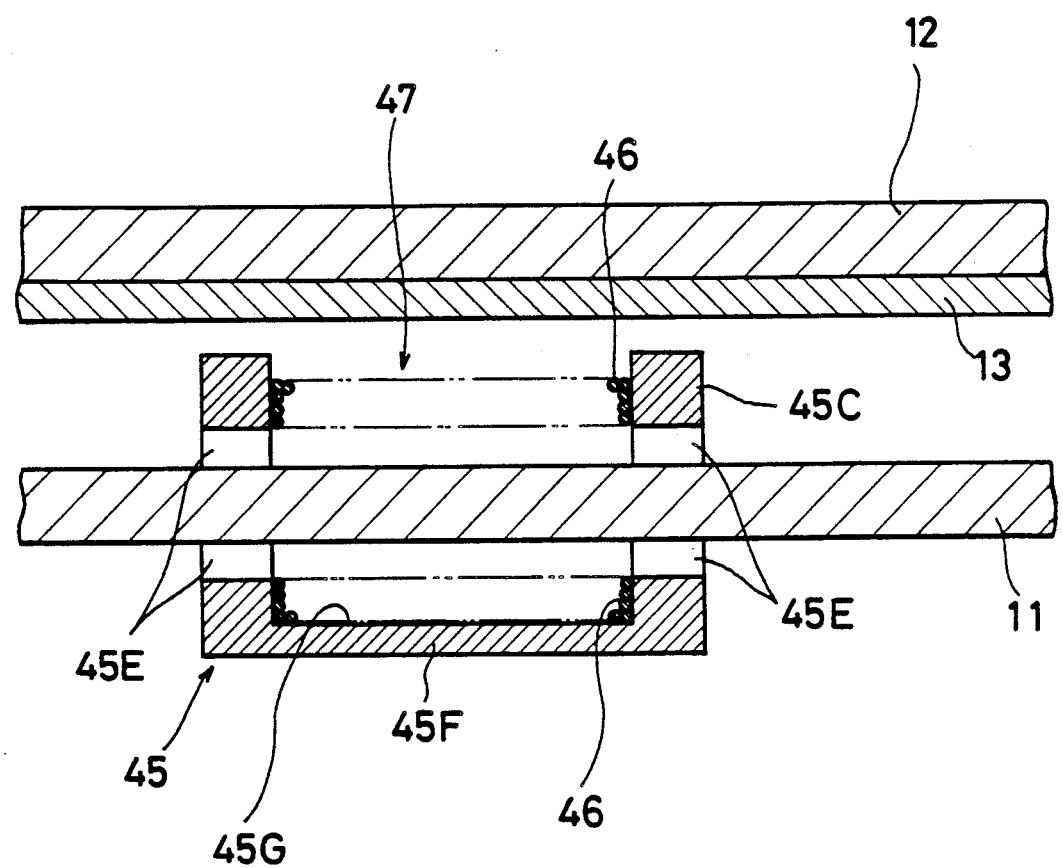
FIG. 7 is a cross-sectional view of a third embodiment of present invention.

FIG. 7 shows still another embodiment of the present invention. In the driving coil 47 of the present embodiment, a coil receiving portion 45F is provided on the outer side of the coil bobbin 45 thereof with respect to the center yoke 11, i.e., that side on which the side yoke 12 is not provided, and a coil 46 is fixedly held on the coil receiving portion 45F. In the other points, the construction of the driving coil 47 is similar to that of the driving coil 37 shown in FIG. 6. The reference character 45C designates rib portions, and the reference character 45E denotes through-holes.

In the driving coil 47 thus constructed, the position of the coil 46 is controlled by the coil receiving surface 45G and therefore, it is not necessary to adjust the vertical relative position of the coil between it and the coil bobbin 45.

Figure 8:
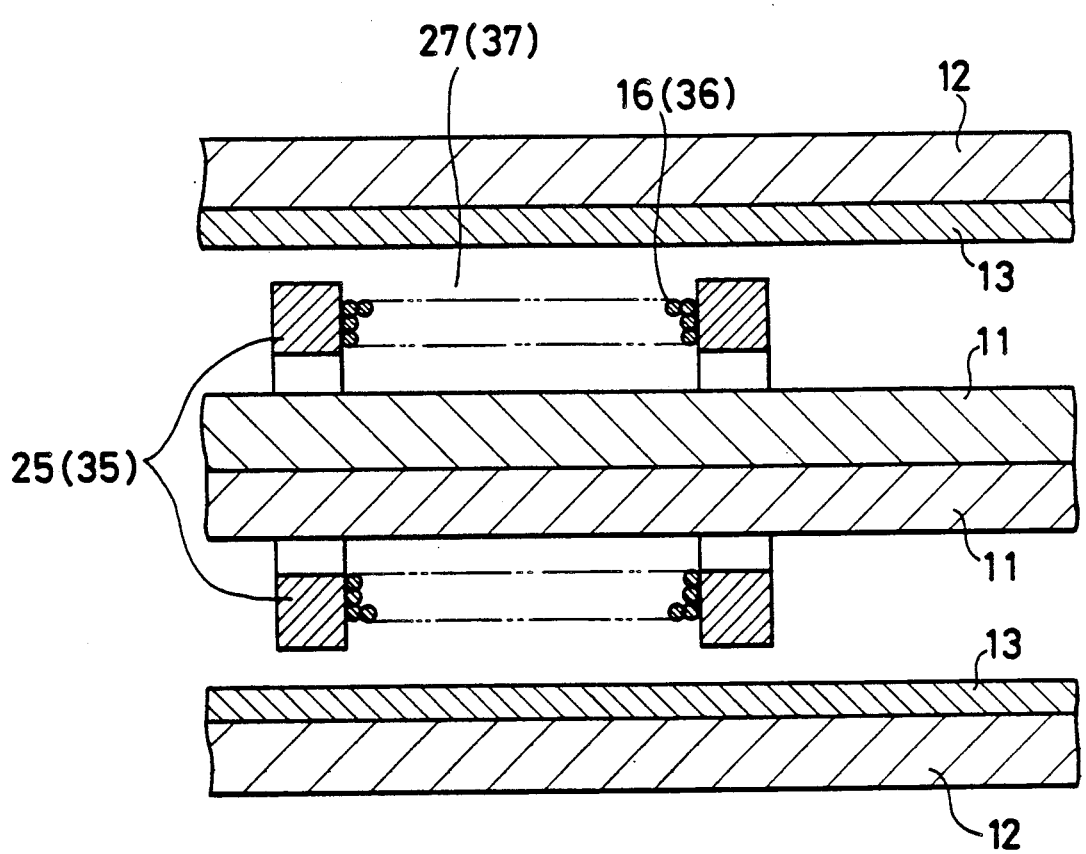
FIG. 8 is a cross-sectional view of a fourth embodiment of present invention.

FIG. 8 shows yet still another embodiment of the present invention. The embodiment of FIG. 8 is one in which the driving force of a coil is twice as great as that in the previous embodiment. This embodiment is one in which a driving coil 27 in the form shown in FIG. 1 or a driving coil 37 in the form shown in FIG. 6 is applied to a linear motor device in which the magnet 13 and the side yoke 12 are disposed symmetrically with respect to the center yoke 11 at the opposite sides thereof. The basic construction of the driving coil 27 or 37 itself does not differ from that which has been previously described, and the vertical width of through-holes 25E or 35E only differs correspondingly to the thickness of the center yoke 11, and of course, a similar effect is obtained.

As has hitherto been described, according to the present invention, the thickness of the portion intervening between the second yoke surrounded by the coil bobbin and the magnet is restricted so that the interval between the second yoke surrounded by the movable driving coil and the magnet dispersed parallel to the second yoke can be set on the basis of the lamination thickness of the coil, whereby the degree of freedom with which the interval between the magnet and the second yoke is set relative to the thickness of the magnet is increased, and not only the optimization of permeance is easy to achieve, but also the thickness of the whole after the assembly of the linear motor can be made small.

Also, if the coil is fixed and thereafter is held on the coil bobbin, the coil need not be wound on the bobbin and the bobbin can be prevented from being deformed by a stress created during winding.

Further, as shown in FIG. 1, the height $h_l$ of the coil-wound portions 25D and 25D of the coil bobbin is such a dimension that the wound coil does not protrude above the upper surface of the rib portions, whereby the circuit plate 25G for the supply of electric power can be disposed on the upper surface of the rib portions and thus, a good result could be obtained in the actual mounting of the circuit.

I claim:

1. A linear motor comprising:
   a first yoke;
   a magnet disposed in opposed relationship with said first yoke with a clearance kept therebetween; and
   a driving coil movable on said first yoke, said driving coil having a coil bobbin provided with a through-hole through which said first yoke extends, and a coil held on said coil bobbin;
   the distance L between said first yoke and said magnet being the sum total of the height of said coil bobbin and the clearance between said coil bobbin and said magnet and the clearance between said coil bobbin and said first yoke.

2. A linear motor according to claim 1, wherein said coil bobbin has coil receiving portions and rib portions, said coil receiving portions being between said rib portions thereof opposed to each other, and wherein said coil is wound between said coil receiving portions.

3. A linear motor according to claim 1, wherein said coil bobbin has a coil housing portion communicating with said through-hole and extending through a surface opposed to said first yoke and said magnet, and wherein said coil is housed in said coil housing portion.

4. A driving apparatus for an optical pick-up unit using the linear motor of a recording-reproducing apparatus comprising:
   a pedestal;
   a head carriage for holding said optical pick-up unit thereon; and
   first and second linear motors for moving said head carriage, said first and second linear motors being disposed in opposed relationship with each other and parallel to the direction of driving of said head carriage, each of said linear motors comprising:
   a first yoke mounted on said pedestal parallel to the direction of movement of said head carriage;
   a second yoke disposed parallel to said first yoke;
   a magnet fixed to said second yoke and keeping a predetermined clearance between said magnet and said first yoke;
   a coil bobbin fixed to said head carriage and having a through-hole through which said first yoke extends; and
   a coil held on said coil bobbin;
   the distance between said first yoke and said magnet being the sum of the height of said coil bobbin, the clearance between said coil bobbin and said magnet, and the clearance between said coil bobbin and said first yoke.

5. A driving apparatus for optical pick-up means for recording or reproducing information on or from a recording or reproducing medium comprising:
   a coil bobbin fixed to a head carriage for holding the optical pick-up means thereon;
   a yoke member;
   a magnet; and
   a coil, said yoke member, said magnet, and said coil together comprising a magnetic circuit of a linear motor for driving said coil bobbin;
   said coil bobbin having a through-hole extending through to said yoke member, and a space portion communicating with said through-hole;
   wherein said coil is housed in said space portion, and wherein said coil bobbin and said coil together form a driving coil.

* * * * *

UNITED STATES PATENT AND TRADEMARK OFFICE
CERTIFICATE OF CORRECTION

PATENT NO. : 4,992,684
DATED : February 12, 1991
INVENTOR(S) : Norio Matsui

It is certified that error appears in the above-identified patent and that said Letters Patent is hereby corrected as shown below:

SHEET 7/12/ OF THE DRAWINGS:

Above figure insert the words --FIG. 7--.

COLUMN 1:

Line 60, "caoused," should read --caused--.

COLUMN 2:

Line 18, "becomes," should read --becomes--.

COLUMN 5:

Line 12, "height h/" should read --height $h_1$--.

Signed and Sealed this

Eighth Day of December, 1992

Attest:

DOUGLAS B. COMER

Attesting Officer          Acting Commissioner of Patents and Trademarks